June 26, 1962

E. KLEIN 3,040,967

VALVE BAGS

Filed Sept. 22, 1958

INVENTOR
ERNST KLEIN
By: Burger, Dinklage & Sprung
ATTORNEYS

June 26, 1962

E. KLEIN

3,040,967

VALVE BAGS

Filed Sept. 22, 1958

INVENTOR
ERNST KLEIN
By: Burgess, Dinklage & Sprung
ATTORNEYS

June 26, 1962  E. KLEIN  3,040,967
VALVE BAGS

Filed Sept. 22, 1958  7 Sheets-Sheet 3

INVENTOR
ERNST KLEIN
By: Burgess, Dinklage & Sprung
ATTORNEYS

June 26, 1962  E. KLEIN  3,040,967
VALVE BAGS

Filed Sept. 22, 1958  7 Sheets-Sheet 4

INVENTOR
ERNST KLEIN
By: Burges, Dinklage + Sprung
ATTORNEYS

June 26, 1962 E. KLEIN 3,040,967
VALVE BAGS

Filed Sept. 22, 1958 7 Sheets-Sheet 5

INVENTOR
ERNST KLEIN
By: Burgers, Dinklage & Sprung
ATTORNEYS

June 26, 1962 E. KLEIN 3,040,967
VALVE BAGS

Filed Sept. 22, 1958 7 Sheets-Sheet 7

INVENTOR
ERNST KLEIN
By: Burgess, Dinklage & Sprung
ATTORNEYS 3,040,967
VALVE BAGS
Ernest Klein, Hoste 45, uber Lengerich,
Westphalia, Germany
Filed Sept. 22, 1958, Ser. No. 762,666
Claims priority, application Germany Sept. 24, 1957
8 Claims. (Cl. 229—62.5)

The present invention concerns a valve bag of paper or a similar material having a valve insert in the filling valve of the bag which is provided with a thermoplastic mass serving to close the bag valve, a method of closing the filled bags and an apparatus for sealing the valves.

There is already known a valve bag having an adhesive strip within the valve by which the valve is closed after the filling, there being used as adhesive for the strip a thermoplastic adhesive which is capable of becoming adhesive during the filling by means of heating means applied to the filling device.

This known valve bag can also be developed in the manner that the thermoplastic mass lies on a support which in its turn is adhered to the inner surface of the valve.

This known valve bag can furthermore be so developed that the support is developed as a tubular insert for the valve bag, the thermoplastic mass lying on the inside of said insert.

There is also known a device for carrying out a method in accordance with which thermoplastic adhesive, in particular a bituminous composition, is used as adhesive for the closing of valve bags having an adhesive strip within the valve by which the valve is closed after the filling, and made adhesive during the filling by a heating means applied to the filling device, the filling tube of the bag filling machine being developed as a heater in order to heat the thermoplastic mass from the inside of the bag valve.

In these known paper valve bags in connection with which the thermoplastic and particularly bituminous composition lies on the inside of the valve and is heated by a heatable filling tube before the closing of the bag valve, there is the disadvantage that the outer surface of the filling tube is dirtied by the bituminous composition so that in this way the dependable closing of the bag valves, one after the other, is prevented. Heretofore no means have been found adapted to use the heatable filling tube in such a manner that its outer surface during the heating of the thermoplastic composition located within the bag valve can directly contact said composition without part of the thermoplastic composition adhering in this connection to the outer surface of the filling tube.

Due to the fact that the thermoplastic composition adheres to the outer surface of the filling tube, the latter is imparted a sticky covering so that it can no longer be introduced without difficulty in bag valves which are to be closed one after the other.

Furthermore, in the case of the known paper valve bags which are provided on the insdie of the valve with a thermoplastic adhesive, there is the disadvantage that a thermoplastic adhesive, particularly a bituminous composition which, to be sure, is not to be adhesive at normal temperature, can become undesirably active under certain conditions even when the bag is not filled, for instance when the bags are stored in unfilled condition in excessively warm rooms and particularly when they are exposed in this connection also to pressure, for instance in the manner that they are piled. The bag valve can then not be opened upon the filling of the bags, since the inner surface of the valve canal is already adhered to the unfilled bag.

In order to avoid this, it has already been proposed that while the bag is still unfilled, the adhesive be covered within the valve bag by a protective part which, when the valve bag is placed over the filling spout of the bag filling machine, is brought by said spout into a position which exposes the adhesive places.

In the case of this known valve closure for bags, sacks or the like of paper, the inner wall of the bag valve is provided with a composition which adheres only to an adhesive layer of the same type, in which connection direct contact between the adhesive layers before the unfolding of the bottom and until the filling of the bags is prevented by a suitable protective layer which can be removed when the bag is filled.

In the case of this known valve closure, there is used a fully prepared insertion sheet which is fastened by adhesion of its lower surface to the triangular tuck of the valve bottom which is still open and which insert serves for the formation of the valve.

The upper surface of the insertion sheet is provided with a special application of adhesive which has the known property of adhering firmly to its support, i.e., to the surface of the insertion sheet and so to harden that in this condition it does not adhere to the paper or the like which does not bear any application of adhesive, but the two layers of adhesive which are pressed against each other intimately combine with each other. For instance, adhesives having a base of latex or artificial rubber or their chemical compositions are to fulfill these conditions.

The insertion sheet is provided with a tongue which is so folded while the bag is still unfilled that it covers the special adhesive application located on the surface of the insertion sheet in the region lying between the folding lines of the bag-bottom side flaps. This known bag closure for bags, sacks or the like of paper has the disadvantage that the tongue which is folded over the adhesive layer cannot be brought without difficulty by means of the filling tube from its position covering the adhesive layer into a position exposing the adhesive layer.

When the bag filling valve is placed over the filling tube of the filling machine, which is to be done in the customary manner, the tongue is not operatively grasped by the lower front edge of the filling tube in such a manner that the tongue in this conection is brought from its position folded over the adhesive layer into an extended position exposing the adhesive layer.

The tongue which in the case of the finished, still unfilled bag lies flat against the inner surface of the lower half of the valve channel is not directly touched when the bag valve is placed on the filling tube of the filling machine and as a matter of fact is only touched when the bag valve is pressed upward when placed on the filling tube in such a manner that the lower part of the inner surface of the bag valve rests against the lower part of the outer surface of the filling tube since in customary manner the valve of the bag is not pushed over the filling tube with a snug fit.

However, even if actually a snug fit exists between the inner surface of the valve and the outer surface of the filling tube, the tongue is not sufficiently grasped by the lower edge of the filling tube when the bag valve is placed over the filling tube of the filling machine since the edge of the tongue which rests smoothly against the lower part of the inner surface of the bag valve is unsuited for this.

The lower front edge of the filling tube, when the bag valve is placed on the filling tube of the filling machine slides, namely, without any hindrance over the tongue, which is itself thin, of the insertion sheet, so that the tongue in this connection retains its folded position.

In accordance with the present invention, the existing disadvantages are eliminated in the manner that the thermoplastic composition, preferably a bituminous composition, is so arranged in the region of the bag valve but outside of the inner surface of the valve channel which is formed by the valve insert and can be brought in contact with the filling tube of the bag filling machine, in such a manner that under the action of heat, by actuation of the free end of the valve insert extending out of the bag valve, it can be divided bipolarly at a line extending parallel to the longitudinal axis of the valve channel and can serve for closing the valve bag.

In this way, the result is obtained that the outer surface of the filling spout does not come in contact with the thermoplastic composition during the filling and therefore the detrimental dirtying of the outer surface of the filling spout is prevented. In this connection, the bag valve can be opened without difficulty before the filling of the bag even when the unfilled bags have been stored in excessively warm rooms and were possibly also exposed in this connection to pressure, for instance in the manner that the bags were piled.

Furthermore, the possibility is afforded of producing the valve insert and arranging it in the bag valve in a simple manner and the bag valve can be closed completely tight after the filling of the bag.

The invention is applicable both in the case of tongue-shaped and in the case of tube-shaped valve inserts.

One embodiment consists therein that in the case of a tongue-shaped valve insert provided with an S or double fold, its end, the edge of which faces the inside of the bag, is firmly adhered to the lower half of the valve channel inner surface, the thermoplastic composition is arranged in the region of the fold adjacent the valve-forming corner tuck and the other overlying fold passes into the other end of the tongue-shaped valve insert which extends freely outward from the valve bag.

Another embodiment consists therein that in the case of a tongue-shaped valve insert provided with an S fold, its end, the edge of which faces the inside of the bag, is adhered firmly below the upper half of the valve channel inner surface; the thermoplastic composition is arranged in the vicinity of the fold adjacent the valve bottom, and the other underlying fold passes into the end of the tongue-shaped valve insert extending freely outward from the bag valve.

Another embodiment consists therein that on the lower half of the valve channel inner surface, a tongue-shaped valve insert is adhered and in another embodiment a tongue-shaped valve insert is adhered below the upper half of the valve channel inner surface.

Furthermore, one embodiment consists therein that the tongue-shaped valve insert is so developed that with the double-fold unfolded, its end, extending out of the bag valve, can be folded over the bag bottom and can be adhered in an antipode-like manner to the bag bottom by means of the bipolarly-divided thermoplastic composition.

In the case of tubular valve inserts, the invention can be used for instance in the following manner:

Such an embodiment consists therein that the thermoplastic composition is arranged between the facing inner surfaces of a pocket arranged in the bag valve with which pocket there is associated a valve tube end extending outwardly from the bag valve and which can be tucked into the pocket.

Another embodiment consists therein that in case of a valve tube arranged in the bag valve the free end of which tube extends outward from the bag valve and is surrounded by an auxiliary tube which is in circumferential close connection with the valve tube only at its end facing the inside of the bag, the thermoplastic composition is arranged between the facing surfaces of the auxiliary tube and of the valve tube.

Another embodiment consists therein that in the case of a valve tube arranged in the bag valve and which is provided with a double fold which can be unfolded by actuation of the valve tube end extending outwardly from the bag valve, the thermoplastic composition is arranged within the region of the fold adjacent the corner tuck forming the valve and adjacent the bag bottom, and the other fold facing the inside of the valve tube passes into the end of the tubular valve insert extending out of the bag valve.

An embodiment which can be used both in the case of tongue-shaped and in the case of tubular valve inserts consists therein that the tongue-shaped or tubular valve insert provided with the thermoplastic composition and a double fold, which can be unfolded, has associated with it an additional double fold serving for the leading away of dust from the filling material out of the region of the thermoplastic composition. Finally the thermoplastic composition can also be arranged at separate points, preferably in the region of the additional double fold.

The object of the invention is thereby further developed and improved that in connection with a tongue-shaped or tubular valve insert provided with a fold extending transverse to the valve channel of the valve bag and the end of which, the edge of which faces away from the inside of the bag, is adhered firmly in an undisplaceable manner in a region on the inner surface of the valve which lies toward the valve opening, and the thermoplastic mass is arranged, preferably spaced from said region, in a region lying toward the inside of the bag between the inner surface of the valve channel and the surface of the valve insert facing same, in which connection the other end of the valve insert extends freely outward in a pullable manner from the valve bag.

In this way there is achieved a particularly simple embodiment of the valve insert in combination with the thermoplastic composition associated with it, namely, an unfoldable double fold is provided for those above described valve embodiments in connection with which the end of the valve insert extending outward from the bag valve is so actuated in longitudinal direction of the valve channel that in this connection the thermoplastic composition is bipolarly divided and can serve for the closing of the valve bag.

Such a valve insert having a double fold is however not as easy to manufacture in combination with the thermoplastic compositions associated with it as a valve insert having a single fold using the now further developed and improved embodiment. This valve insert with a single fold can be made by a particularly simple apparatus and can, in this connection, be rapidly introduced in proper manner into the bag valve.

Furthermore, in the case of the valve insert with the single fold, the number of plies within the folded part of the valve insert is decreased as compared with a valve bag having a double fold, resulting in the advantage that the thermoplastic composition can be heated more rapidly through the smaller number of plies of the fold, with less consumption of heat than through twice the number of plies of the fold. Furthermore, due to the smaller number of plies of the fold, paper is saved.

Due to the fact that a tongue-shaped valve insert is provided with the corresponding thermoplastic composition only on the lower or only under the upper half of the valve-channel inner surface or possibly both valve inserts are provided jointly but one on the lower and the other under the upper half on the valve-channel inner surface, the possibility is afforded of using the one or other of these embodiments in the development of the bag in accordance with the individual case. In the case of a filling material which is not very fine, a tongue-shaped valve insert can namely be sufficient in order to close the bag valve sufficiently tight with it. If the bag valve, however, is to be closed particularly tight, then there are advisedly employed two tongue-shaped valve inserts and the one is arranged on the lower half and the other under the upper half of the valve channel inner surface.

Another such embodiment consists therein that the valve insert is connected with the inner surface of the valve channel only by means of a thermoplastic mass.

Due to the fact that in this connection there is used only one bituminous composition, the manufacture of the bag is simplified since it is not necessary in connection with the arrangement of the valve insert to apply, in addition to the thermoplastic composition, a normal heat insensitive adhesive.

Since only one thermoplastic composition is to be applied, the apparatus necessary for this purpose can be of simpler development than an apparatus by means of which two types of adhesive are to be applied.

Another embodiment consists therein that in the case of a single valve tube arranged in the valve channel of the bag valve, the thermoplastic composition is arranged between the outer surface of said tube and the inner surface of the valve channel.

Since in the case of this embodiment only a single fold less valve tube is required, it can be produced in a simple manner with a particularly small consumption of paper and be introduced into the bag valve by means of a particularly simple device known per se.

The invention also concerns a method of closing filled valve bags which are developed in accordance with the invention.

As described above, the thermoplastic composition is made pliable and tacky under the action of heat before it serves for closing the valve bag. The heating of the thermoplastic composition serving for the closing of the bag valve is effected in this connection by means of the heated filling tube of the bag filling machine in that very short time interval during which the bag to be filled hangs from the filling tube of the bag filling machine. Since a very short time interval is sufficient for the carrying out of the filling process, the heating of the thermoplastic composition must also take place during this period of time, which is not possible without difficulties. The heat transfer must, in this connection, namely take place too rapidly, so that the thermoplastic composition at moderate degrees of heat is not heated sufficiently throughout. This could, it is true, be achieved by the application of high degrees of heat which however has the result that they have a very detrimental effect on the paper of the valve bag treated therewith since the paper is heated too suddenly and therefore is made too brittle.

This invention is therefore further developed by a method by which the filled paper valve bags, after they have been pulled off from the filling spout of the bag filling machine, are fed to a conveyor belt device by means of which they are guided, the bag corner, provided with the bag valve, aligned with each other, sliding along a heat rail or over a heating rail by means of which the thermoplastic composition arranged in the bag valve achieves a tacky pliancy under the action of heat before it is divided by pull-actuation of the free end of the valve insert extending out of the valve bag in a bipolar manner along a line extending parallel to the longitudinal axis of the valve channel and then serves for the closing of the bag valve.

In this way the result is obtained that the heating of the thermoplastic composition serving for the closing of the bag valve does not take place too rapidly as previously by means of the heated filling tube of the bag filling machine but rather after the removal of the filled paper valve bags from the filling tube of the bag filling machine and gradually during the course of the further conveyance of the filled bags which is effected by means of a conveyor belt device.

Since this further conveyance of the filled paper valve bags takes place over a path which is not too short, the heating of the valve corner provided with the bag valve and of the valve insert associated with it having the thermoplastic composition can be gradually introduced and gradually increased up to the maximum limit necessary. Due to the fact that the filled paper valve bags are so carried and guided by the conveyor belt device in alignment with each other that the bag corners provided with the bag valve slide along a heating rail or are moved over a heating rail by means of which the thermoplastic composition arranged in the bag valve is imparted tacky pliancy under the action of heat, the free ends of the valve inserts extending out of the valve bags can be so actuated, one after the other, in a continuous operation by a simple gripping and pulling device in the direction of the longitudinal axis of the valve channel that the thermoplastic composition is in this connection divided bipolarly along a line extending parallel to the longitudinal axis of the valve channel and thereupon the automatic closing of the bag valve takes place.

This method can advisedly also be carried out in the manner that in this connection the heating of the thermoplastic composition, with omission of the heating rail, is effected by electric heat radiators.

The method can be supplemented in the manner that after the process of closing the bag valve, the bag corner provided with the valve, the valve insert and the thermoplastic composition is subjected to a cooling process by means of a stream of cold air or the like.

In this way the result is obtained that the thermoplastic mass is cooled and sets more rapidly and accordingly the bag valve is more rapidly closed tight.

The method can also be supplemented in the manner that the bag corner provided with the valve, the valve insert and the thermoplastic composition is moistened after the closing of the bag valve by means of spray water or the like.

In this way there is again obtained the normal moisture content of the paper which upon the closing of the bag valve was dried out to a certain extent by the action of heat.

Finally the method can also be supplemented by the fact that after the closing of the bag valve, the end of the valve insert extending out of the bag valve is folded over the bag bottom and adhered to it.

In this way there is obtained an additional closure assurance and it is avoided that the end of the valve insert extending out of the bag valve protrudes in too bulky a manner toward the outside and flaps around in an undesirable manner.

Thus, broadly considered, the method of the invention involves filling and sealing a bag provided with a valve, which comprises inserting a filling tube in the valve channel, filling the bag, removing the filling tube from the valve channel, thereafter gradually heating the thermoplastic material to softening temperature, and with the thermoplastic material in softened condition, moving at least a portion of the insert relative to the channel so as to expose the thermoplastic material for sealing of the channel, and then urging the channel closed causing the thermoplastic material to seal the channel.

For the carrying out of this method, there can be used in accordance with the invention a conveyor belt device which consists of a flat conveyor belt on which the filled bags which are laid flat are aligned and guided in longitudinal direction in horizontal position and of a conveyor belt arranged below same which serves to receive the filled bags in aligned manner, preferably in vertical position, and there is so associated with this conveyor belt the heating rail that the bag corner provided with the bag valve can be slidably moved along over same; and in this connection a gripping and pulling device is used to actuate the free end of the valve insert extending out of the bag valve.

Another embodiment of the apparatus for the carrying out of the method is characterized by the fact that the conveyor belt device consists of a flat conveyor belt on which the filled bags laid flat are aligned and guided in longitudinal direction and horizontal position and below same a conveyor belt is provided which serves to receive the filled bags in mutually aligned manner, preferably in vertical position, while below it there is provided a flat conveyor belt on which the filled bags are moved in opposite direction jointly with the conveyor belt arranged above the same, and in this connection borne by the lower conveyor belt while with this lower flat conveyor belt a heating rail is associated in such a manner that the bag corner provided with the bag valve can move slidably over same, the heating rail extending upward in the form of a circular arc at a distance from the outer periphery of the conveyor belt which corresponds at least to the length of the filled bags.

These devices can also be so developed that instead of a heating rail, electric heat radiators are associated with them.

These devices can also be characterized by the fact that a blower producing a stream of cold air for the cooling of the bag corner provided with the valve closed under the action of heat is associated with it after the final end of the heating rail or the electric heat radiator, and/or by the fact that there is associated with it, adjoining the final end of the heating rail or the electric heat radiator, a spray device for moistening the bag corner provided with the valve which is closed under the action of heat.

Embodiments in accordance with the invention are shown schematically in the drawing, in which.

The invention provides a bag having a valve for use in filling the bag and sealing means for permanently sealing the valve closed following filling thereof. The valve includes a channel into which the filling tube can be inserted and includes sealing means for permanently sealing the valve following filling thereof. The sealing means includes an insert comprising a strip of material at least partly disposed axially within the channel so that it lines at least a portion thereof. A mass of thermoplastic material is interposed between a portion of the insert and a portion of the wall of the valve channel, and means are provided which secure the thermoplastic material to the inner surface of the channel wall, and means are also provided for securing the thermoplastic material to the insert. As the thermoplastic material is interposed between a portion of the insert and the channel wall, a filling tube can be inserted into the channel with the insert interposed between the filling tube and at least a portion of the channel wall and without the filling tube contacting the thermoplastic material. Provision is made so that following softening of the thermoplastic material, at least part of the insert can be moved relative to the channel in such a manner that the thermoplastic material is separated bipolarly, i.e. axially of the channel. Thus, following filling of the bag, removal of the filling tube from the valve channel, and softening of the thermoplastic material, the thermoplastic material can be separated bipolarly permitting sealing of the valve.

In the embodiments shown in FIGS. 1 to 7, and 10 to 15, and 35 and 36, the end portion of the insert disposed adjacent the inwardly disposed end of the channel is arranged as an S fold which terminates with an insert end piece disposed adjacent a portion of the channel wall and provides a first fold and a second fold, the first fold being disposed inwardly of the second fold. The thermoplastic material is disposed in the second fold and an adhesive material refractory to the softening temperature of the thermoplastic material is disposed between and adhesively engages the insert end piece and the channel wall.

As shown in the drawing, the channel is disposed along one end of the bag, and is of tubular form. The insert can be either semi-tubular or tubular. Where the insert is semi-tubular, it is advantageously disposed so that it substantially lines the semi-tubular portion of the channel, either adjacent or remote from the end of the bag along which the channel is arranged. If desired, the insert can be made up of two semi-tubular pieces arranged so that together, they substantially completely line the tubular channel.

Where the insert is tubular, it can be coaxially disposed with respect to the channel so that it substantially lines the same.

Figure 1:
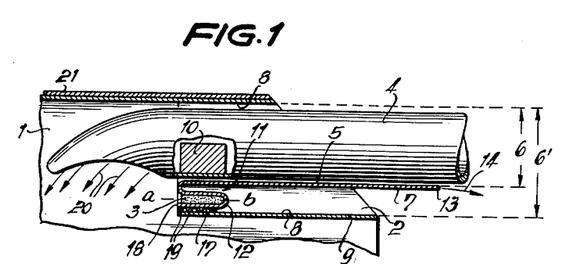
FIG. 1 shows a bag corner with the bag valve in section and a filling spout introduced into the bag valve, seen from the side.

As can be seen in FIG. 1 of the drawing, in the case of the valve bag 1 having the bag valve 2, the thermoplasic composition 3 is arranged in the vicinity of the bag valve 2, but outside of the inner surface 5 of the valve channel 6, which can come into contact with the filling tube 4 of the bag filling machine. By this inner surface 5 of the valve channel 6, there is to be understood the inner surface 5 which is formed by the valve insert 7, in contradistinction to that inner surface 8 of the valve channel 6', which in general is formed by the valve-forming corner tuck 9 of the bag 1. Since the thermoplastic composition 3 is arranged outside the inner surface 5 of the valve channel 6 formed by the valve insert 7, the composition 3 cannot come into contact with the filling tube 4 when the latter is in the valve channel 6. The thermoplastic composition 3 can be made pliable and adhesive only under the action of heat. This is effected in the arrangement shown in FIG. 1, advisedly by a filling tube 4, known per se, which is surrounded by a double-walled jacket in the hollow spaces of which heaters are provided which are heated by electrical current.

The heating of the filling tube 4 is effected in this connection advisedly not in the manner that the entire filling tube is heated, but rather that it is heated only in a narrow region 10, indicated in FIG. 1 by the hatched surface which is then in heat-transfer contact with the thermoplastic composition 3 when the bag 1 hangs from the filling spout 4 of the bag filling machine. In this way, the hand of the operator is prevented during the filling of the bag from coming in contact with the heated zone of the filling tube 4 and the result is obtained that no unnecessary heating takes place at the points of the bag valve which are not provided with the thermoplastic composition 3.

The heating of the thermoplastic composition 3 is effected, as shown in FIG. 1, from the filling tube 4 in the region 10 in the manner that the heat flow passes through the fold 11 of the valve insert 7 adjacent the filling tube 4, and then passes to the thermoplastic composition 3 which is arranged in the region of the fold 12 adjacent the valve-forming corner tuck 9 so that here the thermoplastic composition 3 is made pliable and adhesive under the action of heat.

Figure 2:
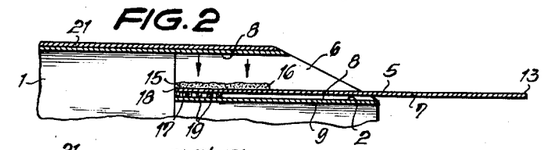
FIGS. 2 to 13 are each a section through the bag corner with the bag valve and the tongue-shaped or tube-shaped valve inserts arranged therein.

By actuation of the free end 13 of the valve insert 7 extending out of the bag valve 2 in the direction of the arrow 14, the S fold consisting of the first fold 11 and second fold 12 is unfolded and in this connection, the heated thermoplastic composition 3, which is disposed in the second fold 12, is divided in bipolar manner along the line a—b which extends parallel to the longitudinal axis of the valve channel so that a double adhesive surface is produced with the adhesive places 15 and 16 which can be noted in FIG. 2.

The actuation of the free end 13 of the valve insert 7 extending out of the bag valve 2 in the direction of the arrow 14 can, after the filling of the bag 1, be effected by hand immediately after its withdrawal from the filling tube 4. This actuation can also be effected in the manner that upon the withdrawal of the bag 1 from the filling tube 4 of the bag filling machine, the end 13 of the valve insert 7 is held on the filling tube 4 until the S fold consisting of the folds 11 and 12 has unfolded.

The thermoplastic composition 3 is applied thickly in the production of the bag 1 so that after the bipolar division of the composition 3, strongly adhesive adherence points 15 and 16 rather than weak ones are produced. The bipolar division of the composition 3 takes place under the action of the heat directly at the line a—b which extends through the center of the composition 3 so that the adherence points 15 and 16 receive a uniformly thick portion of the total composition 3 after its bipolar division.

The bag valve is closed in the manner that the bag valve is compressed in the direction indicated by the arrow in FIG. 2.

In the embodiment shown in FIG. 1, in the case of the tongue-shaped valve insert 7 provided with an S fold, the end piece 17 of which, which has its rear edge 18 facing the inside of the bag, is adhered firmly to the lower half of the valve channel inner surface 8, the thermoplastic composition 3 is arranged in the region of the fold 12 adjacent the valve-forming corner tuck 9, while the other overlying fold 11 passes into the tongue-shaped valve insert 7 which extends freely outward from the bag valve. The adhesive serving for the adhering of the end 17 of the valve insert 7, which adhesive is indicated in the drawing by points 19, must naturally be of such a nature that it does not become loose under the action of heat, i.e. it is refractory to the softening temperature of the thermoplastic material 3.

The arrows 20 in FIG. 1 indicate the direction of flow of the filling material emerging from the filling tube 4.

Figure 3:
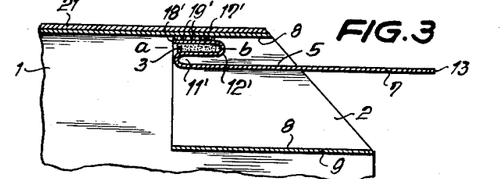
Figure 4:
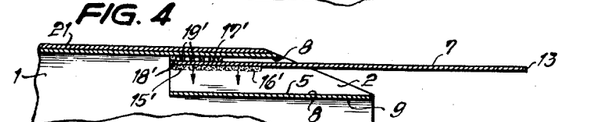

The embodiment shown in FIGS. 3 and 4 of the drawing is characterized by the fact that in case of a tongue-shaped valve insert 7 provided with a double fold, its end 17', whose edge 18' faces the inside of the bag, is firmly adhered under the upper half of the valve channel inner surface 8 by means of an adhesive indicated by the point 19' and which does not loosen under the action of heat; the thermoplastic composition 3 is arranged in the region of the fold 12' adjacent the bag bottom 21 and the other underlying fold 11' passes over into the end 13 of the tongue-shaped valve insert 7 which freely extends outward from the bag valve 2.

In the embodiment shown in FIGS. 3 and 4, the thermoplastic composition 3 arranged in the upper region of the valve channel between the fold 12' is heated by a filling tube 4 which is developed in such a manner that it can be heated in this upper region. The closing of the bag valve is effected after the unfolding of the double fold in the manner that it is compressed in the direction of the arrow indicated in FIG. 4.

The manner of operation of the embodiment shown in FIGS. 3 and 4 of the drawing therefore is substantially the same as in the case of the embodiment shown in FIGS. 1 and 2, with the sole difference that the tongue-shaped valve insert 7 in the case of the valve development according to FIGS. 1 and 2, is fastened below in the valve bag, while in the valve development in accordance with FIGS. 3 and 4, it is fastened on top.

In these two embodiments, in accordance with FIGS. 1 to 4, the two adhesive places 15 and 16 and 15' and 16' respectively are connected with the opposite surface portions of the valve channel inner surface 8 which is not provided with a thermoplastic composition.

Figures 5, 6, 7:
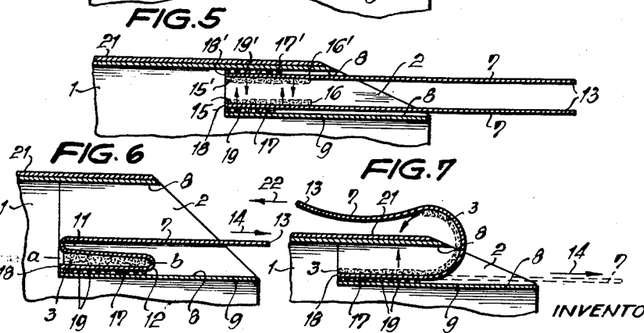

In FIG. 5, there is shown an embodiment which is characterized by the fact that on the lower half of the valve channel inner surface 8, a tongue-shaped valve insert in accordance with FIGS. 1 and 2 is adhered and under the upper half of the valve channel inner surface 8, the tongue-shaped valve insert 7 in accordance with FIGS. 3 and 4 is adhered.

In FIG. 5, this arrangement is shown with developed double folds of the two tongue-shaped valve inserts. The arrangement of the two valve inserts before the unfolding of their double folds can be noted in FIG. 1 for the lower valve insert and in FIG. 3 for the upper valve insert.

Upon the closing of the bag valve the adhesive place 15 combines with the adhesive place 15' and the adhesive place 16 with the adhesive place 16', as indicated by the arrow in FIG. 5.

In FIGS. 6 and 7, there is shown an embodiment in which the tongue-shaped valve insert 7 is so developed that with the S fold unfolded, its end 13 extending out of the bag valve 2 can be folded over onto the bag bottom 21 and adhere to the latter in an antipode-like manner by means of the bipolarly provided thermoplastic composition 3.

Thus, in the embodiment depicted in FIGS. 6 and 7, the bag includes a tubular channel disposed along one end of the bag, and the insert is an elongated strip of material partially disposed axially along the channel lining a portion thereof remote from the end of the bag along which the channel is disposed. The axial length of the S fold in the insert exceeds the axial length from the S fold to the outwardly disposed end of the channel adjacent the end of the bag along which the channel is disposed, and hence, when the S fold is unfolded, a portion of the insert covered with thermoplastic material extends to without the channel and the insert can be folded over the end of the bag along which the channel is disposed and can then be adhesively secured to the outside surface of said end.

In FIG. 6, the valve insert 7 is shown with the double fold still folded. Upon the closing of the bag valve 2, the end 13 of the valve insert 7 is actuated in the direction of the arrow 14 in such a manner that the double fold is unfolded and in this connection the thermoplastic composition 3 is bipolarly divided along the line a—b. The bag valve 2 is compressed and the end 13 of the valve insert 7 is adhered firmly to the bag bottom 20 in the stretched position. The wall of the bag valve 21 is then adhered to in an antipode-like manner from below and above by means of the divided composition 3, as indicated by the arrows directed toward each other in FIG. 7. The end 13 of the valve insert 7 during the closing process and before it is adhered firmly to the bag bottom 21 is stretched taut in the direction of the arrow 22.

Figure 8:
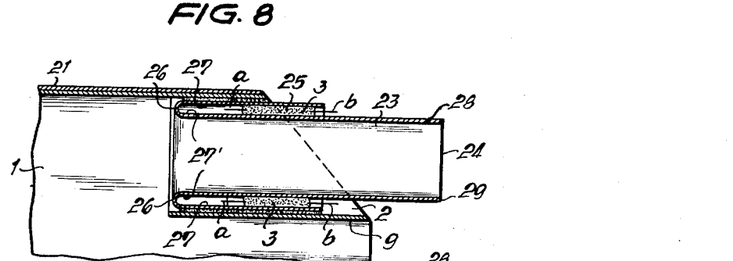
Figure 9:
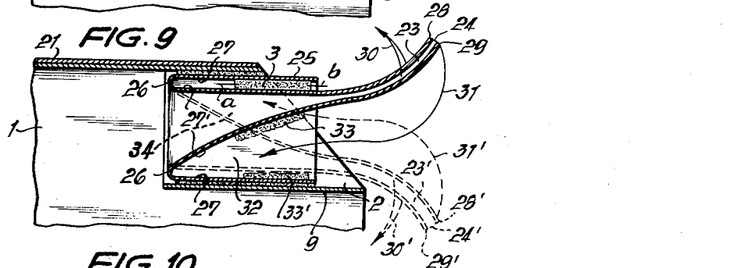

In the embodiment shown in FIG. 8 and FIG. 9, the valve channel is tubular and the insert is also tubular and is coaxially disposed with respect to the channel. The inwardly disposed end of the channel is arranged as a C fold terminating with an insert end piece disposed adjacent a portion of the channel wall and providing an insert fold. Thermoplastic material is disposed in the insert fold and adhesive material refractory to the softening temperature of the thermoplastic material is disposed between and adhesively engages the insert end piece and channel wall. After softening the thermoplastic material in the insert fold, the thermoplastic material can be bipolarly separated by radially moving a part of the insert disposed outwardly of the C fold and the channel can be closed by tucking the outwardly disposed end of the insert to intermediate the bipolarly separated thermoplastic material.

In the arrangement shown in FIG. 8, in combination with FIG. 9 of the drawing, in connection with a valve tube 23 arranged in the bag valve 2 and the free end 24 of which extends outward from the bag valve 2 and is surrounded by an auxiliary tube 25, which is in circumferentially tight connection with the valve tube 23 only at an end 26 facing the inside of the bag, the thermoplastic composition 3 is arranged between the facing surfaces 27 and 27' of the auxiliary tube 25 and the valve tube 23.

After the heating of the thermoplastic composition 3, the upper valve tube half 28 is brought together with the lower valve tube half 29 at the end 24 extending outward from the bag valve in the manner which can be noted from FIG. 9 of the drawing. In this connection, the end 24 of the valve tube 23 is moved upward in the direction indicated by the arrow 30 so that in this way the thermoplastic composition 3 is bipolarly divided. The outward protruding end 24 of the valve tube 23 is then turned over downward in the direction indicated by the arrow 31 and introduced into the pocket 32 located below the lower valve tube half 29. Since due to the division of the thermoplastic composition 3 along the line a—b, the adherence points 33 and 33' noticeable in FIG. 9 have been produced, the end 24 of the valve tube 23 introduced into the pocket 32 lies between these two adherence points 33 and 33' so that it is held fast in an antipode-like manner by these two adherence points after the bag valve 2 has been pressed closed.

In case of this process for the closing of the bag valve, the thermoplastic composition 3 in the upper half of the bag valve 2 can remain substantially unaffected by the action of the heat so that only the part of the thermoplastic composition 3 which is arranged in the lower half of the bag valve 2 is sufficiently heated and therefore can be divided bipolarly at the lower line a—b.

In this embodiment shown in FIGS. 8 and 9, the closing of the bag valve can however also be effected in the manner that the thermoplastic composition 3 is sufficiently heated only in the upper region of the bag valve 2 so that the composition arranged in the lower region of the valve is not bipolarly divisible. The outward protruding end 24' is then moved downward upon the closing of the valve in the direction of the arrow 30' and the thermoplastic composition is in this connection divided in the upper region of the valve bipolarly along the line a—b. The end 24' is then folded upward and introduced in the direction of the arrow 31 into the upper pocket 34'. This process is indicated in FIG. 9 by dotted lines.

Figure 10:
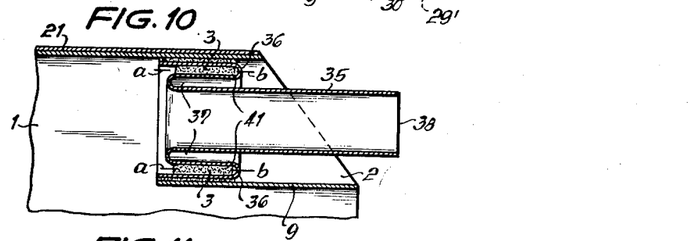
Figure 11:
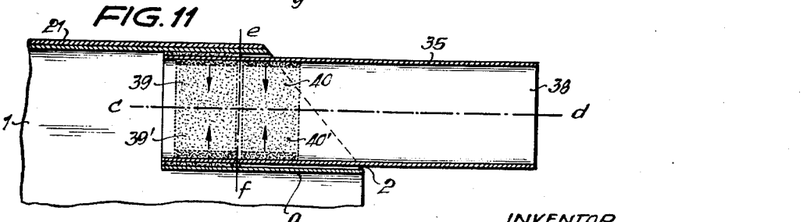

In FIG. 10, in combination with FIG. 11 of the drawing, there is shown a valve development in case of a valve tube 35 arranged in the bag valve 2 which is provided with an S fold consisting of the folds 36 and 37, which folds can be unfolded by actuation of the valve tube end 38 extending outward from the bag valve; the thermoplastic composition 3 is arranged in the region of the corner tuck 9 forming the valve and the region of the fold 36 adjacent to the bag bottom 21, and the other fold 37 facing the inside of the valve tube passes into the end 38 of the tubular valve insert 35 extending outward from the bag valve 2.

Upon the unfolding of the S fold consisting of the folds 36 and 37, the heated thermoplastic composition 3 is bipolarly divided so that the adherence-point fields 39 and 39', 40 and 40' which can be noted in FIG. 11, result, the adherence-point fields 39 and 40 being located in the region of the upper valve tube half, which extends above the line c—d and the adherence-point fields 39' and 40' being located in the region of the lower valve tube half which extends below the line c—d.

On the line e—f which extends transverse to the valve tube 35, there can possibly be present an area free of the thermoplastic composition 3 between the adherence fields 39 and 39' to the left of the line e—f and the adherence fields 40 and 40' to the right of the line e—f. The thermoplastic composition 3 is so applied in this case in the region of the fold 36 upon the manufacture of the bag that it does not extend to the inner fold edge 41 (FIG. 10).

When the bag valve shown in FIG. 11 is compressed in the direction of the arrows indicated, the adherence field 39 combines with the adherence field 39' and the adherence field 40 with the adherence field 40' so that in this way the bag valve 2 is tightly closed.

Figure 12:
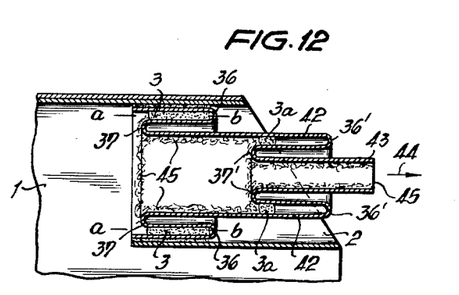
Figure 13:
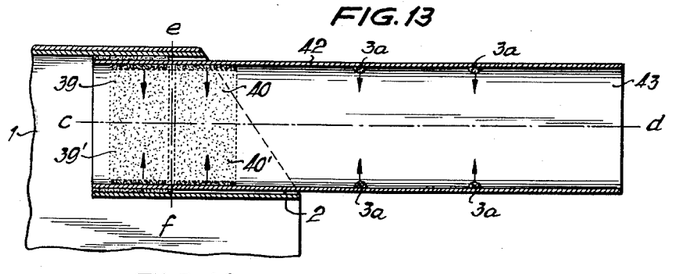

In the embodiment shown in FIGS. 12 and 13, the channel and insert are each of tubular form, and the insert includes a second S fold which is disposed intermediate the first S fold, which is positioned adjacent the inwardly disposed end of the insert, and the outwardly disposed end of the channel.

Thermoplastic material is positioned in the outwardly disposed fold of the second S fold. Upon axially outwardly moving the free end of the insert in the direction indicated by the arrow 44, each of the S folds is unfolded and sealing is effected in a manner shortly to be described.

In FIG. 12 together with FIG. 13 of the drawing, there is shown a valve bag 1 in connection with which the tubular valve insert 42 provided with the thermoplastic composition 3 and an unfoldable S fold has associated with it an additional S fold serving to lead dust formed by the filling material away from the region of the thermoplastic composition 3.

The one S fold, as in the arrangement shown in FIG. 9, consists of the folds 36 and 37. The additional S fold shown in FIG. 12 of the drawing consists of folds 36' and 37'.

When the end 43 of the tubular valve insert 42 extending outwardly from the bag valve is actuated in the direction of the arrow 44, the additional S fold consisting of the folds 36' and 37' first unfolds and then the S fold consisting of the folds 36 and 37. In this connection, the heated thermoplastic composition 3 is bipolarly divided along the lines a—b.

In the region of the additional S fold, the thermoplastic composition 3a may be arranged preferably spotwise.

This spotwise arrangement is preferable for the reason that then the thermoplastic composition 3a arranged in the fold 36' is more easily divisible in heated condition than the thermoplastic composition 3 arranged in the fold 36 which due to its wider extent is not so easily divisible. In this way, the result is obtained that upon the unfolding of the two S folds, first of all the additional double fold unfolds, so that in this process first of all there is conducted outward from the region of the thermoplastic composition a part of the dust of the filling material which collects upon the filling of the bags in the inside of the valve channel.

In FIG. 12 of the drawing, this filling-material dust is indicated by the small arcuate lines 45.

Figures 14, 15:
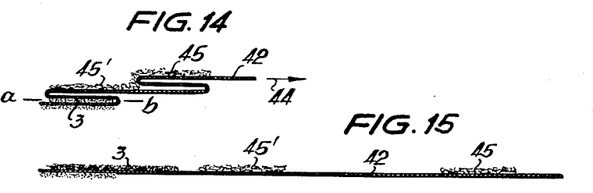
FIGS. 14 and 15 show the manner of operation of the additional double fold which serves to lead the dust formed by the filling material away from the region of the thermoplastic composition.

In FIG. 14, in combination with FIG. 15, there is shown schematically the manner of operation of the S fold with respect to the carrying away of the dust 45 of the filling material. When the S folds of the valve insert 42 shown in FIG. 14 are unfolded in the direction indicated by the arrow 44, first the filling-material dust 45 and then the filling-material dust 45' are conducted outward in the manner approximately indicated in FIG. 15. The filling-material dust 45 and 45' is then removed from the region of the thermoplastic composition 3.

When the bag valve shown in FIG. 13 is compressed in the direction of the arrows indicated therein, the adhesive field 39 combines with the adhesive field 39' and the adhesive field 40 with the adhesive field 40', so that in this way the bag valve is closed tight.

Furthermore the opposite places of the spotwise thermoplastic composition 3a combine with each other when the unfoldable tubular valve insert 42 is compressed in the direction of the arrows indicated therein.

Figure 16:
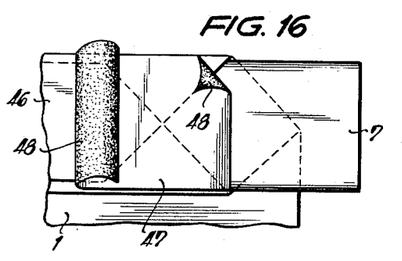
FIG. 16 shows a bag corner in flattened condition, seen from above, with an outward protruding valve insert and with a bottom cover sheet arranged on the bag bottom.

In FIG. 16 there is shown the corner of a valve bag 1 having an outward-protruding valve insert 7 and a bottom cover sheet 47 arranged on the bag bottom 46, the parts 48 thereof being shown in a folded-over position in order better to show the arrangement of the bottom cover sheet 47 on the bag bottom 46.

Instead of heating the thermoplastic composition 3 by means of the filling tube 4, this can also be effected after the removal of the filled bag on a conveyor belt by means of heating rail or via irradiation.

In the embodiments shown in FIGS. 18 to 21, and 25 to 26, the end portion of the insert disposed adjacent the inwardly disposed end of the channel is arranged as a C fold terminating with an insert end piece disposed adjacent a portion of the channel wall, and thermoplastic material is disposed intermediate the end piece and the channel wall and adhesively engages the adjacent surfaces of the end piece and channel wall. As shown in FIGS. 18 to 21, the thermoplastic material can be positioned adjacent the inwardly disposed end of the channel, and an adhesive material refractory to the softening temperature of the thermoplastic material can be disposed intermediate the insert end piece and the channel wall axially outwardly of the thermoplastic material.

As can be noted from the drawing, FIGS. 17 to 24, in connection with a tongue-shaped valve insert 51 provided with a fold 50 extending transverse to the valve channel of the bag valve 2 (FIGS. 18, 19 and 24) or else a tubular valve insert 51' (FIGS. 17, 20, 21, 22 and 23), the end piece of which 52 and 52' respectively whose edge 53 and 53' respectively faces away from the inside of the bag, is firmly adhered in an undisplaceable manner in the region c to the vertical channel inner surface 54, namely by an adhesive 55 which does not loosen under the action of heat, and the thermoplastic composition 56 is arranged, preferably at a distance d, toward the inside of the bag from this region c in the region e between the valve channel inner surface 54 and the surface 57 of the valve insert 51 and 51' respectively facing the same. In this connection, the other end 58 and 58' of the valve insert 51 and 51' respectively extends freely outward in pullable manner from the bag valve 2.

The thermoplastic composition 56 can be made pliant and tacky only under the action of heat. This is effected either by a heated filling tube of the bag filling machine when the bag is suspended from this filling tube during the filling or after the removal of the filled bag from said filling tube, for instance on a conveyor belt by means of heating rails, possibly by heat irradiation.

Figure 21:
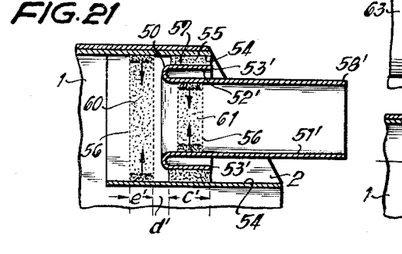
FIG. 21 shows the bag corner of FIG. 20 with the tubular valve insert, the free end of which is pulled outward in such a manner that the thermoplastic composition can serve for the closing of the bag valve.
Figure 23:
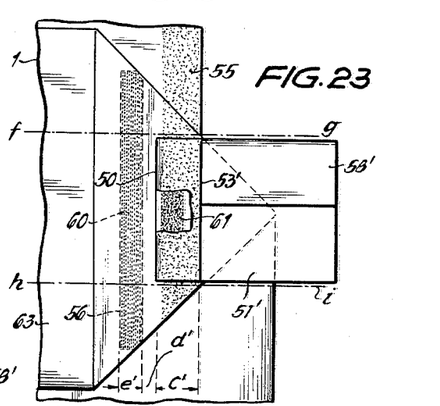
FIG. 23 shows the bag corner of FIG. 22, in which connection the free end of the valve insert is so pulled outwardly that the thermoplastic composition can serve for the closing of the bag valve.
Figure 24:
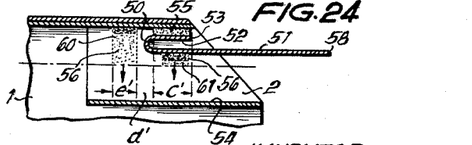
FIG. 24 shows the bag corner of FIG. 19, in which connection the free end of the valve insert is so pulled outwardly that the thermoplastic composition can serve for closing the bag valve.

By actuation of the free end 58 or 58' extending out of the bag valve 2 in the direction of the arrows 59 indicated in the drawing, the valve insert 51 or 51' respectively is so pulled outward that the heated thermoplastic composition 56 is thereby bipolarly divided along the line a—b which extends parallel to the longitudinal axis of the valve channel so that the double thermoplastic adhesive surfaces 60 and 61 are produced, as can be noted in FIGS. 21, 23 and 24.

The adhesive surface 60 lies in this connection in the region of the valve channel of the bag valve 2 which has been exposed by the outwardly moved fold 50 of the valve insert 51 or 51' respectively and the adhesive surface 61 lies in the region of the valve insert 51 or 51' respectively, as shown in FIGS. 21, 23 and 24.

The bag valve 2 is closed thereby in that it is pressed together in the known manner. In this connection, in the case of a tubular valve insert 51', the adhesive surfaces 60 and 61 combine with each other in the manner indicated by the arrows directed toward each other, as shown in FIG. 21. In this way the bag valve 2 is closed in the region of the adhesive surface 60 and also at a distance therefrom in the region of the adhesive surface 61 and therefore is double-closed.

Figure 17:
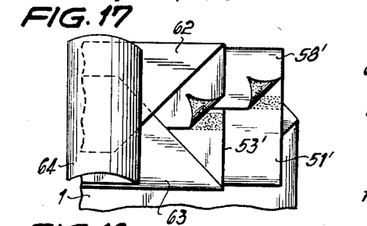
FIG. 17 shows the bag corner of a flattened valve bag with closed crossed bottom, with a tubular valve insert arranged in the bag valve and with a bottom cover sheet. In order to show the valve insert more clearly, the bottom cover sheet and two corners of the tubular valve insert are shown in folded over position.
Figure 18:
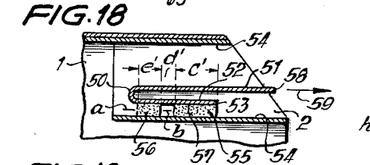
FIG. 18 shows a bag corner in section, with a tongue-shaped valve insert arranged on the lower half of the valve channel inner surface.
Figure 22:
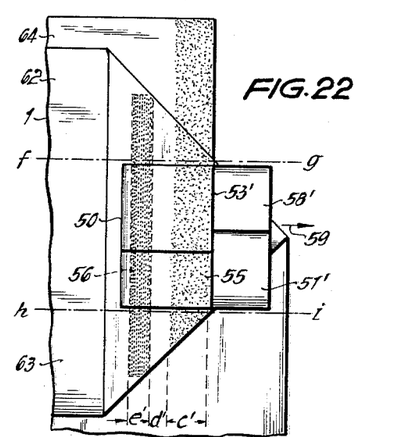
FIG. 22 is a perspective showing of a bag corner in accordance with FIG. 17 with the valve insert in the spread-open bag bottom.

In FIG. 22 there is shown a bag corner according to FIG. 17 with spread bag bottom with a tubular valve insert so as to clearly show the position of the adhesive 55 which does not loosen under the action of heat and of the thermoplastic composition 56 associated therewith in the bag valve. The tubular valve insert 51' shows in FIG. 22 the position which it assumes when the bag is still unfilled before the closing of the bag valve. The bag-bottom side flaps 62 and 63 are turned back along their fold lines f—g and h—i, the bag-bottom side flap 62 being shown with a bottom cover sheet 64.

In FIG. 23, there is shown the bag corner of FIG. 22, in which connection the free end 58' of the tubular valve insert 51' is pulled outward in the direction of the arrow 59 shown in FIG. 22. The adhesive surface 60 of the thermoplastic composition 56 lies here in the region e of the valve channel which has been exposed by the outwardly pulled fold 50 and the adhesive surface 61 of the thermoplastic composition 56 lies within the tubular valve insert 51'. In order to show the position of the adhesive surface 61, a part of the outer wall of the tubular valve insert 51' is broken away in FIG. 23.

Figure 19:
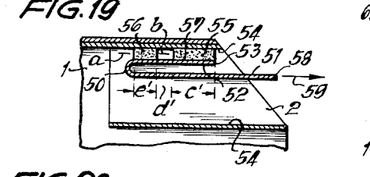
FIG. 19 shows a bag corner in section with a tongue-shaped valve insert arranged below the upper half of the valve channel inner surface.
Figure 20:
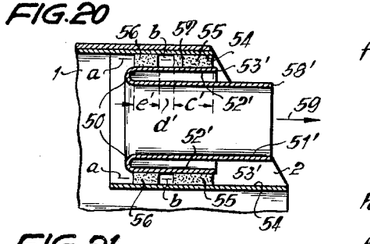
FIG. 20 shows a bag corner in section with the tubular valve insert in its position covering the thermoplastic composition.

In FIG. 24, there is shown the bag corner of FIG. 19 in which connection the free end 58 of the valve insert 51 is so pulled outward in the direction of the arrow 59 (FIG. 18) that the thermoplastic composition 56 can serve for closing the bag valve 2.

When this valve bag 2 is compressed, the adhesive surfaces 60 and 61 close the valve bag 2, as indicated by the arrows (FIG. 24). In the case of the tongue-shaped valve insert 51, it can be arranged alone on the lower half of the channel inner surface (FIG. 18) or alone below the upper half (FIG. 19).

One tongue-shaped valve insert 51 can possibly also be arranged on the lower valve channel inner surface and thus jointly the other tongue-shaped valve insert 51 below the upper valve channel inner surface.

This embodiment, with two tongue-shaped valve inserts is not shown in the drawing. It results from the combination of the tongue-shaped insert 51 in FIG. 18 and the tongue-shaped insert of FIG. 19.

Figure 25:
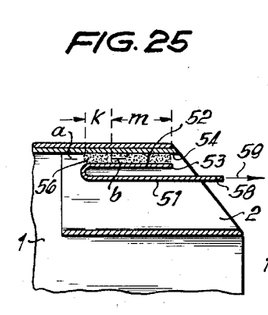
FIG. 25 shows a bag corner with a tongue-shaped valve insert which is connected under the upper half of the valve channel inner surface only by means of a thermoplastic composition.

In FIG. 25 there is shown an embodiment in connection with which the tongue-shaped valve insert 51 is connected only by means of a thermoplastic composition 56 with the inner surface 54 of the valve channel of the bag valve 2. The adhesive 55 is eliminated in this case. When this valve bag is to be closed, the thermoplastic composition 56 must then be heated toward the inside of the bag only over a distance $k$ and be made pliable until tackiness. Over the distance $m$, the heating of the thermoplastic composition 56 must not be effected to such an extent that the valve insert 51 is completely loosened in this region when its end 58 extending out of the bag valve 2 is actuated in the direction of the arrow 59.

Figure 26:
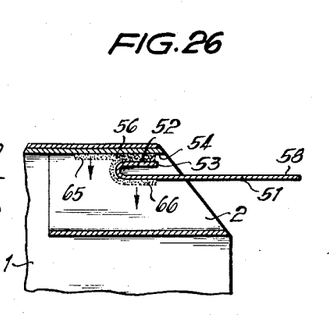
FIG. 26 shows the bag valve of FIG. 25 in which connection the free end of the valve insert is so pulled outwardly that the thermoplastic composition can serve for closing the bag valve.

After the heating of the thermoplastic composition 56 over the distance $k$, the end extending out of the bag valve can be pulled so far outward in the direction of the arrow 59 that the thermoplastic composition 56 is divided bipolarly along the line $a$—$b$ over the distance $k$ and there results in this connection the adhesive surfaces 65 and 66 visible in FIG. 26. Upon a compression of the bag valve 2, these adhesive surfaces are active in the direction of the arrows.

Figure 27:
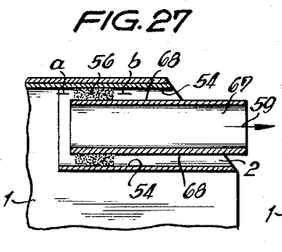
FIG. 27 shows a bag corner with a simple valve tube arranged therein, in which connection the thermoplastic composition is arranged between the outer surface of said tube and the inner surface of the valve channel.
Figure 28:
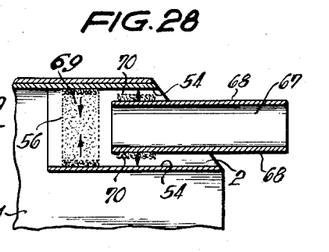
FIG. 28 shows the bag corner of FIG. 27, in which connection the single valve tube is pulled so far toward the outside that the thermoplastic composition can serve to close the bag valve.

In FIGS. 27 and 28, there is shown an embodiment in which connection a simple valve tube 67 is arranged in the valve channel and the thermoplastic composition 56 is arranged between the outer surface 68 of the simple valve tube 67 and the inner surface 54 of the valve channel. Upon the closing of this bag valve 2, the simple valve tube 67 is pulled outward so far in the direction of the arrow 59 that an adhesive surface 69 and an adhesive surface 70 of the thermoplastic composition 56 can be active all around, as can be noted from FIG. 28.

Upon compression of the bag valve 2, these adhesive surfaces 69 and 70 close the bag valve in the direction of the arrows shown in FIG. 28.

The apparatus of the invention for sealing the filling valve of filled valve bags comprises a conveyor means and means for feeding the bags onto the conveyor means with the bags uniformly oriented on the conveyor means and with weight of material in the bag urging the valve channels closed. Provision is made for heating the thermoplastic material so that it is provided in softened condition as the bags are moved by the conveyor means. The apparatus includes an insert actuating device which moves at least a part of the valve insert relative to the valve channel as the bags are moved by the conveyor means and so as to expose the thermoplastic material for sealing after the heating of the thermoplastic material to softening temperature. For heating the thermoplastic material, there can be provided a heating rail which is arranged along the course of the conveyor for sliding engagement thereof with the valves of the bags. Alternatively, the thermoplastic material can be heated by radiators disposed along the course of the conveyor means. The apparatus can also include means for cooling the thermoplastic material following the moving of the valve insert relative to the bag channel. Further, the device can include a moistening means which dampens the valve following the heating thereof.

In a preferred embodiment of the apparatus of the invention, the means for feeding the bags onto the conveyor means with bags uniformly oriented thereon includes an auxiliary conveyor disposed over the conveyor means. The auxiliary conveyor includes an upper flight and a lower flight and a plurality of containers are secured thereto. Each of the containers extends outwardly of the auxiliary conveyor and terminates in an open end remote from the conveyor and is adapted to receive a bag as the auxiliary conveyor traverses its upper flight. The lower flight is disposed adjacent the conveyor means and is arranged for resting the bags on the conveyor means and maintaining the bags in the containers as the containers are moved along the conveyor means. The feeding device can include a guide means for guiding the containers from the upper flight to the lower flight. Advantageously, the guide means includes an arcuate rail arranged for sliding engagement thereof by the bags contained in the containers and the rail is disposed to be traversed by the bag valves and means are provided for heating the rail so that the thermoplastic material of the valve bags can be heated as the bags traverse the arcuate course.

As can be noted from FIG. 29 in combination with FIG. 30 of the drawing, the filled paper bags 1 after their removal from the filling spout of the bag filling machine, neither of which is shown in the drawing, are fed to a conveyor belt device which consists of a flat conveyor belt 71, on which the filled bags 1 laid flat, are aligned in longitudinal direction and horizontal position and guided, and then transferred to a conveyor belt 72 located below which serves to receive the filled bags 1 in aligned manner in preferably vertical position. With this conveyor belt 72, a heating rail 73 is so associated that the bag corner 75 provided with the bag valve 74 can be moved in a sliding manner over the heating rail 73. By means of the heating rail 73, the thermoplastic composition 76 (FIGS. 35 and 36) arranged in the bag valve 74 is imparted a tacky pliancy under the action of the heat coming from the heating rail 73 before it is divided bipolarly by the pulling of the free end 77 of the valve insert 78, 78' (see FIG. 35) extending out of the bag valve 74 along a line $a$—$b$ extending parallel to the longitudinal axis of the valve channel and serves for the closing of the bag valve 74.

Figure 34:
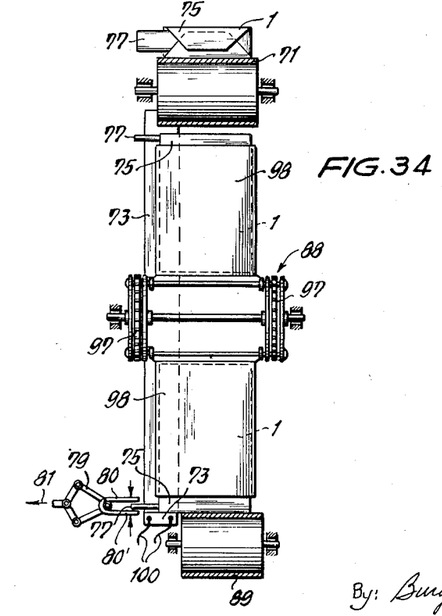
FIG. 34 is a section along the line E—F of FIG. 33.

The actuation of the free end 77 of the valve insert 78, 78' extending out of the bag valve 74 is effected by a gripping and pulling device 79 (FIG. 34). This device includes a U bar 100 formed by arms which are hingedly joined by an hinge. A solenoid having power leads is operatively interposed between the arms of the U bar for moving the arms toward and away from each other by pivoting the arms about the hinge. A puller 79', provided with means (not shown) for reciprocating the same, engages the U bar, and reciprocates it in synchronization with the action of the solenoid; suitable synchronizing means (not shown) being provided for this purpose. Thus, the gripping and pulling device 79 is moved so far outward in the direction of the horizontal arrow 81 that the S folds consisting of folds 82 and 83 and 82' and 83' respectively (FIG. 35) are unfolded, and in this connection the heated thermoplastic composition 76 is so divided bipolarly at the line $a$—$b$ which extends parallel to the longitudinal axis of the valve channel that a double adhesive surface 84 and 85 and 84' and 85' respectively is produced which connects with each other upon the closing of the valve bag as indicated in FIG. 36 by the arrows. The bag valve 74 is closed in the manner that it is compressed in the direction of these arrows.

Figure 35:
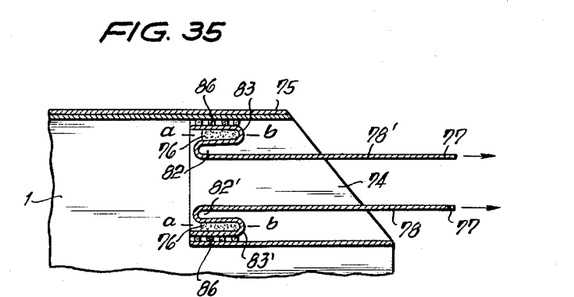
FIG. 35 shows a bag corner with valve inserts and the thermoplastic composition arranged therein before the unfolding of the valve inserts.
Figure 36:
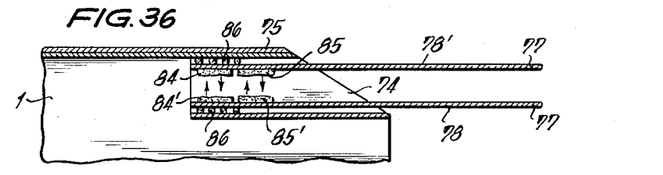
FIG. 36 shows the bag corner of FIG. 35 with unfolded valve inserts shortly before the closing of the valve.

In FIGS. 35 and 36 an annular valve insert 78 and 78' respectively are fastened by normal adhesive 86 on the top and bottom of the bag valve 74 respectively, as indicated by the points 86. The invention is however applicable both in connection with tongue-shaped valve inserts which may be fastened individually on bottom or on top or both on bottom and on top in the valve channel, as well as in connection with tubular valve inserts.

Figures 29, 30, 31, 32:
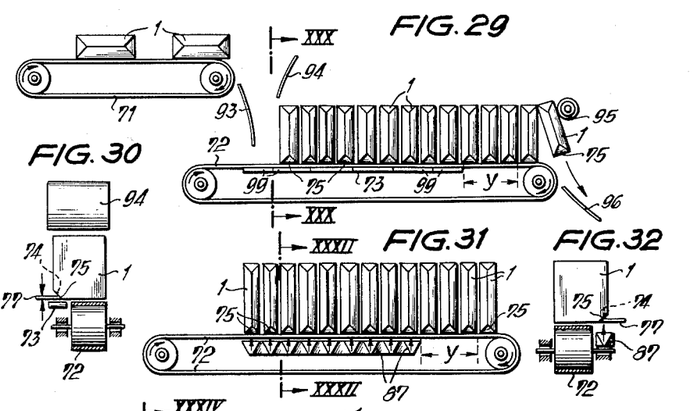
FIG. 29 shows a device for the carrying out of the process in side view, the heating of the thermoplastic composition being effected by means of a heating rail.
FIG. 30 is a section along the line A—B of FIG. 29.
FIG. 31 is a conveyor belt, which instead of a heating rail, has electric heat radiators.
FIG. 32 is a section along the line C—D of FIG. 31.

As can be noted from FIG. 31 in combination with FIG. 32 of the drawing, the heating of the thermoplastic composition 76 can also be effected, with the elimination of the heating rail 73, by electric heat radiators 87. These are shown in FIGS. 31 and 32 and it is indicated by the upper directed arrows that the electric heat radiators 87 conduct the heat flow in the direction of these arrows against the bag corners 75 of the paper valve bags 1 provided with the bag valves 74, which bags are carried and guided by the conveyor belt 72. The conveyor belt 71 shown in FIG. 29 associated with the conveyor belt 72 has been omitted in FIG. 31.

Figure 33:
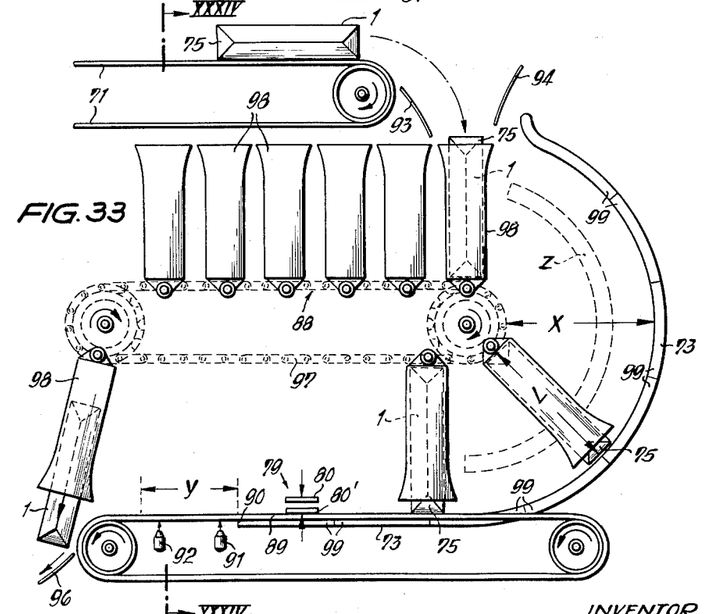
FIG. 33 is another embodiment of the apparatus for the carrying out of the method, on a larger scale.

In FIG. 33, in combination with FIG. 34 of the drawing, there is shown, on a larger scale, a conveyor belt device which consists of a flat conveyor belt 71 below which there is arranged a conveyor belt 88 which serves to receive the filled bags 1 in aligned manner while under this conveyor belt 88 there is arranged a flat conveyor belt 89 on which the filled bags 1 are moved in opposite direction together with the conveyor belt 88 arranged above same, and are supported in this connection by the lowermost conveyor belt 89. This lowermost flat conveyor belt 89 has a heating rail 73 associated with it in such a manner that the bag corner of the paper valve bag 1 provided with the bag valve is passed in a sliding manner over same, in which connection the heating rail 73 extends upward in arcuate form at a distance X from the outer periphery of the conveyor belt 88 which distance must be such that it corresponds at least to the length L of the filled bags 1. This arcuate part of the heating rail 73 impedes the bags 1 also upon transfer from the conveyor belt 88 to the conveyor belt 89 so that they do not pass too rapidly over this path as a result of their weight. Furthermore, it is possible to arrange over this transition path an additional braking device Z, such as indicated by the arcuately-extending dotted lines.

Adjoining the final end 90 of the heating rail 73 or the electric heat radiators 87, there can be provided a blower 91 which blows a stream of cold air against the bag corner 75 of the bag 1 provided with the bag valve 74, which takes place on a section Y indicated in FIGS. 29, 31 and 33 of the drawing. On this section Y, a spray device 92 may also act. In FIG. 33 the blower 91 and the spray device 92 are indicated schematically while they have been omitted in FIGS. 29, 31 and 34 for greater ease in reading the drawing.

In the drawing, FIG. 29, there are shown guide members 93 and 94 which can consist of smooth plate which impart the necessary guidance to the bags 1 when they are transferred from the conveyor belt 71 to the conveyor belt 72. The limiting roller 95 serves to retard the bags 1 at their upper end so that they pass from the conveyor belt 72 onto the guide member 96 which may consist of smooth plate and can be further conveyed from there, as indicated schematically in FIG. 29.

In FIG. 31 of the drawing, these parts 93, 94, 95 and 96 have been omitted.

With the conveyor chains 97 of the conveyor belt 88 (FIGS. 33 and 34), there are articulated collecting funnels 98 which serve to receive the paper bags 1 from the conveyor belt 71 and guide them in the manner shown in FIG. 33.

The heating rail 73 in FIGS. 29 and 33 are advantageously so subdivided into fields 99 that each field can be heated individually to the temperature desired. The heating of the heating rail 73 is advisedly effected electrically, as indicated in FIG. 34, by the connecting wires 100; however, it can also be heated by steam or hot water.

The filled bags 1 can also be conducted downward and upward by the conveyor belts 71 and 72 if these conveyor belts are suitably developed and arranged, for instance if they have a corresponding oblique position.

What is claimed is:

1. A bag provided with a valve for use in filling the bag and sealing means for permanently sealing the valve closed following the filling of the bag, said valve comprising means defining a channel for receiving a bag filling tube whereby the bag can be filled, said sealing means including an insert comprising a strip of material at least partly disposed axially within the channel and lining at least a portion thereof, the end portion of the insert disposed adjacent the inwardly disposed end of the channel being arranged as an S fold terminating with an insert end piece disposed adjacent a portion of the channel wall and providing a first fold and a second fold with the first fold disposed inwardly of the second fold, a mass of an adhesive bituminous thermoplastic material interposed between a portion of the insert and wall of the channel, said adhesive bituminous thermoplastic material being disposed in said second fold, an adhesive material refractory to the softening temperature of said adhesive bituminous thermoplastic material being disposed between and adhesively engaging said insert end piece and the channel wall, and means for securing said adhesive bituminous thermoplastic material to the insert, whereby a filling tube can be inserted into the channel with the insert interposed between the filling tube and at least a portion of the channel wall and without the filling tube contacting said adhesive bituminous thermoplastic material, means for moving at least a part of the insert relative to the channel when said adhesive bituminous thermoplastic material is softened for separating said adhesive bituminous thermoplastic material bipolarly, whereby following filling of the bag said adhesive bituminous thermoplastic material can be softened by heating and with the filling tube withdrawn from the channel at least part of the insert can be moved relative to the channel separating the thermoplastic material bipolarly permitting sealing of the valve.

2. A bag according to claim 1, the channel being tubular and disposed along one end of the bag, the insert being an elongated strip whereby after softening of said adhesive bituminous thermoplastic material the S fold can be unfolded exposing said adhesive bituminous thermoplastic material to the channel by axially moving the end of the insert opposite said insert end piece, the axial length of the S fold exceeding the axial length from the S fold to the outwardly disposed end of the channel adjacent said end of the bag whereby when the S fold is unfolded a portion of the insert covered with said adhesive bituminous thermoplastic material extends to without the channel and the insert can be folded over said end of the bag and adhesively secured to the outside surface thereof.

3. A bag according to claim 1, the channel being tubular and the insert being semi-tubular.

4. A bag according to claim 3, the channel being disposed along one end of the bag, the channel being tubular and the insert being substantially semi-tubular and substantially lining the semi-tubular portion of the channel adjacent the said end of the bag.

5. A bag according to claim 3, the channel being disposed along one end of the bag, the channel being tubular and the insert being substantially semi-tubular and substantially lining the semi-tubular portion of the channel remote from said end of the bag.

6. A bag according to claim 3, the channel being disposed along one end of the bag, the channel being tubular and there being two inserts, each insert being substantially semi-tubular and substantially lining a semi-tubular portion of the channel.

7. A bag according to claim 1, the channel being tubular and the insert being tubular and coaxially disposed with respect to the channel.

8. A bag according to claim 7, said insert including a second S fold disposed intermediate the first mentioned S fold and the outwardly disposed end of the channel, thermoplastic material positioned in the outwardly disposed fold of the second S fold.

References Cited in the file of this patent

UNITED STATES PATENTS

| | | |
|---|---|---|
| Re. 19,803 | Weaver | Dec. 31, 1935 |
| 2,098,258 | Rowe | Nov. 9, 1937 |
| 2,437,693 | Hartman | Mar. 16, 1948 |
| 2,476,325 | Rowe | July 19, 1949 |
| 2,729,377 | O'Neil | Jan. 3, 1956 |
| 2,778,175 | Bryce | Jan. 22, 1957 |
| 2,825,497 | Hitt | Mar. 4, 1958 |
| 2,845,214 | Finke | July 29, 1958 |
| 2,855,136 | Clay | Oct. 7, 1958 |
| 2,884,182 | Woodward | Apr. 28, 1959 |